Dec. 3, 1963 J. N. REID 3,112,966

RECORD CONTAINER

Filed Dec. 16, 1960

INVENTOR.
JOHN NORMAN REID

BY R. E. Geauque
ATTORNEY 3,112,966
Patented Dec. 3, 1963

3,112,966

RECORD CONTAINER

John N. Reid, 5932 Varne Ave., Van Nuys, Calif.

Filed Dec. 16, 1960, Ser. No. 76,404
3 Claims. (Cl. 312—10)

Figure 1:
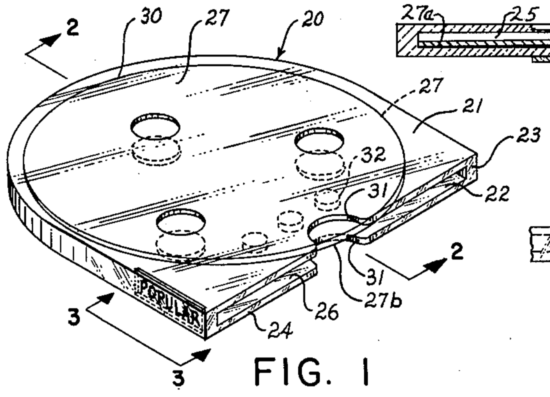

This invention relates to a record container and more particularly to a container for records made out of hard, transparent plastic in order to protect the record against breakage.

At present, records are generally stored in paper sleeves contained between two cardboard covers which are hinged together to form albums, although individual records are also stored in paper sleeves. Generally, the album and single records are so positioned that the records are vertical but sometimes records and albums are stored one on top of the other in a horizontal position. When stored in the vertical position, the records tend to fall over when unsupported at the sides causing breakage, and when the records are inserted downwardly into the sleeve, there is a tendency to break the edge of the record. When stored in the horizontal position, the records cannot be stacked to any height without having the stack fall to one side, and pressure on the top of the stack can cause breakage of a number of records. Besides breakage, the present methods of storage commonly cause the surface of the records to become scratched since the paper sleeve contacts the full grooved surface of both sides of the record. Also, a number of records must be moved in order to locate a particular record. Even in the case of albums containing records stored vertically, a complete album must be removed to select a record therefrom.

By the present invention, an individual record container is provided which is constructed of rigid or semi-rigid material, such as a clear plastic, in order to protect the records against breakage. The container has U-shaped side panels with the curved end having substantially the same curvature as the record stored therein, and the side panels are held apart by a strip of edge material to form an interior compartment of greater thickness than the record. The containers are intended to be stored horizontally and the records are inserted into the containers through the open slit between the side panels at the straight end of the U-shape. The thickness of the interior compartment of the container is such that the front edge of the record, adjacent the open slit, can be held up off of the bottom panel of the container by pads without engaging the top panel so that each record is supported only by the pads and by the bottom panel at the U-shaped end. Thus, no scratching of the surface of the record can possibly occur.

Suitable interlocking means are provided on each side of the container so that the containers can be stacked horizontally, one above the other, and locked together so that one container cannot slide sideways relative to the others. The edge strip at the front of each container can contain a label groove for receiving a label so that the name of the record in each container is clearly visible at all times from the side of the container. In order that a record at any location in a stack of containers can be easily removed without disturbing the rest of the stack, the straight edges of the side panels on opposite sides of the end slot contain finger cutouts so that the edge of the record can be gripped with the thumb and one finger and can be removed without disturbing any of the containers in the stack.

Since the interlocking means can be the same regardless of the size of the container, different size containers for different size records can all be included in a single stack of containers and locked together. Also, the records in a particular stack could be visually segregated into various classifications by using various colors of plastic for the containers.

It is therefore an object of the present invention to provide a record container having a U-shape and open at the straight end to form a slot for the record, the curved end being of substantially the same radius as the record.

Another object of the invention is to provide a rigid, U-shaped record container having an open end slot for inserting the record into the interior compartment of the container; the thickness of said compartment being greater than the thickness of the record so that the record can be held off of the lower panel at the straight, front end and only engage the lower panel at the curved end.

A further object of the invention is to provide a rigid record container having interlocking means so that various size containers can be stacked horizontally in a single stack and can be locked together against lateral movement.

Another object of the invention is to provide a record container constructed of hard, plastic material and having means for continually displaying a label at the side thereof, said plastic being of various colors to classify the types of records.

Figure 2:
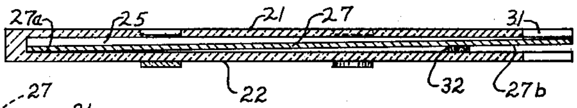
Figure 3:
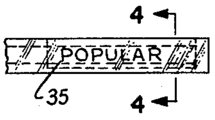
Figure 4:
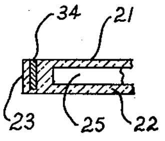
Figure 6:
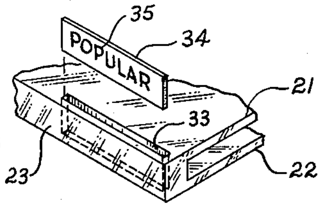
Figure 5:
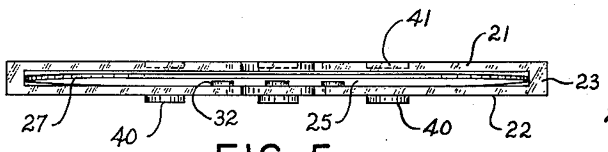
Figure 7:
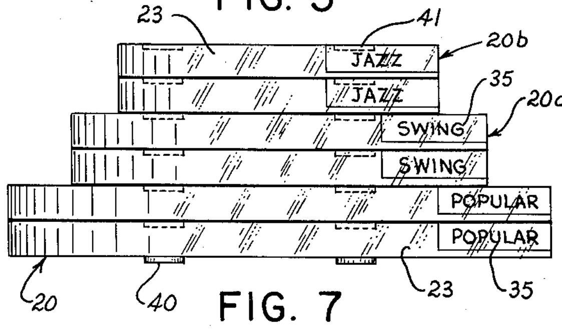
Figure 8:
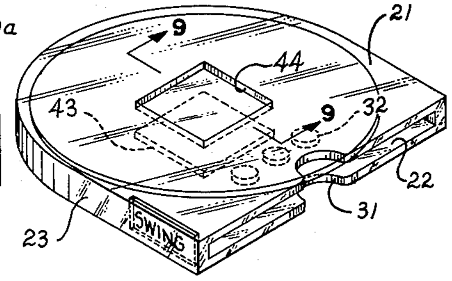
Figure 9:
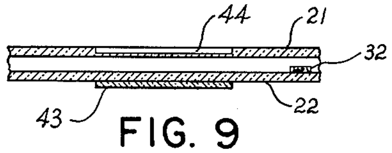
Figure 11:
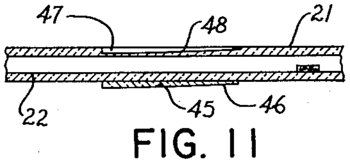
Figure 10:
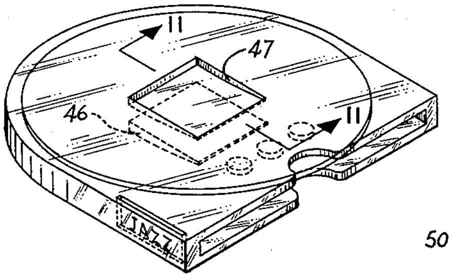
Figure 12:
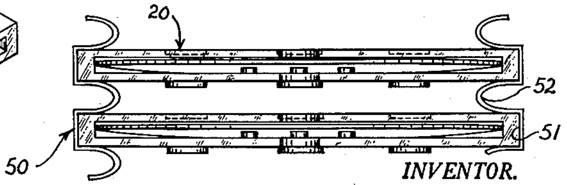

These and other objects of the invention not specifically set forth above will become readily apparent from the accompanying description and drawings in which:

FIGURE 1 is a perspective view of a record container incorporating the present invention, FIGURE 2 is a vertical section along line 2—2 of FIGURE 1 showing the record supported by a plurality of felt pads at the slotted end and contacting the lower panel at the curved end, FIGURE 3 is a side elevational view along line 3—3 of FIGURE 1 showing the location of the label for each container, FIGURE 4 is a vertical section along line 4—4 of FIGURE 3 indicating the slot in the edge of the container for receiving the label, FIGURE 5 is an end elevational view of the slotted end of the container of FIGURE 1 showing the protrusions and indentations for interlocking the containers, FIGURE 6 is a perspective view of the corner of the container of FIGURE 1 illustrating the manner in which the label is inserted into the label slot, FIGURE 7 is a side elevational view of a stack of containers containing containers of various sizes, such as are required for 33, 78 and 45 speed records now generally in use, FIGURE 8 is a perspective view similar to FIGURE 1 of a record container having modified interlocking means comprising a single square protrusion for insertion into a single square depression, FIGURE 9 is a vertical section along line 9—9 of FIGURE 8, FIGURE 10 is a perspective view similar to FIGURE 8 of a record container having another modified interlocking means comprising a square, tapered protrusion for insertion into a square, tapered depression, FIGURE 11 is a vertical section along line 11—11 of FIGURE 10, and FIGURE 12 is an end elevational view of a section of a wire frame for holding apart the individual containers for large records.

Referring to FIGURE 1, the record container 20 is formed of two U-shaped panels 21 and 22 connected together at their sides and curved bottom edge by the continuous edge strip 23. The panels 21 and 22 are held apart by the edge 23 in order to form an interior record compartment 25, and an open slot 26 exists between the straight edges 24 of the panels for inserting a record 27 into the interior of compartment 25.

The curved end 30 of the container has substantially the same radius as that of the record so that the inner edge 27*a* of the record engages a considerable length of the curved portion of strip 23 at the end 30. The side panels 21, 22 and strip 23 can be integrally formed in a single molding operation from a hard, transparent plastic material and the containers can be molded in various sizes to store records of different sizes, such as 33, 45 and 78 r.p.m. records.

The straight edges 24 of the panels 21 and 22 each contain a finger cutout 31. When the record 27 is fully inserted into compartment 25 through the slot 26, the record can be gripped by the thumb and index finger through the cutouts 31. A plurality of thin felt pads are glued or otherwise secured to the interior of the lower panel 22 at a location adjacent the cutout 31 and the straight edges 24. These pads serve to hold the outer edge 27*b* of the record off of the bottom panel 22 so that the record extends into the compartment 25 at an angle with respect to the upper and bottom panels 21 and 22. The outer edge 27*b* is not raised high enough to engage the top panel 21 so that the record is only supported by the pads at the outer edge 27*b* and by the lower panel 22 at the inner edge 27*a*.

The edge 23 contains a label groove 33 at the end thereof adjacent the slot 26. This groove is large enough to receive a label 34 fabricated of any suitable material which can be easily inserted and removed from the groove. Since edge 23 is formed of clear plastic, the title 35 of the record appearing on the label 34 will be clearly visible at the side of the container 20, as illustrated in FIGURE 3.

The containers 20 are positioned horizontally and can be stacked one on top of the other. The bottom panel 22 of each container has three circular protrusions 40 which are positioned at the corners of a triangular configuration. The upper panel 21 of each container has a plurality of circular indentations 41 arranged in the same pattern as the protrusions 40 and just large enough to receive the protrusions 40 on the lower panel 22 of an upper container 20. When the protrusions 40 of the upper container are in the indentations 41 of a lower container, the containers cannot move sideways relative to one another. As illustrated in FIGURE 7, the smaller containers 20*a* and 20*b*, constructed for 78 and 45 r.p.m. records, respectively, likewise have protrusions 40 on the lower panels 22 and indentations 41 in the upper panels 21. Since the protrusions 40 and indentations 41 are located in the same pattern for all sizes of containers, various sizes and numbers of containers can be interlocked in a single stack, as illustrated in FIGURE 7. The protrusions 40 are slightly shorter than the depth of the indentations 41 for all sizes of containers so that the bottom panel of an upper container in a stack engages and is supported over a large area of the upper panel of the lower container. When the containers in a stack are the same size, the upper containers are supported by the rigid edge strips of the lower containers.

The small containers 20*a* and 20*b* utilize only two felt pads 31, rather than the three utilized for the larger containers 20, to support edge 27*b* of the record. Otherwise, the containers of various sizes are constructed the same. Because the felt pads 31 cause the record to be tilted slightly downwardly toward the curved end 30 of the container and also because the felt pads tend to grip the surface of the record, the records have a greater tendency to remain within the container than if they were simply laid horizontally on the bottom panel of the container.

It is understood that various other types of interlocking projections and indentations can be utilized to restrict lateral movement of containers in a stack. One modification is illustrated in FIGURES 8 and 9, wherein the lower panel 22 carries a single large square protrusion 43 and the upper panel 21 contains a single, square indentation 44 to receive a protrusion 43. Another modification is illustrated in FIGURES 10 and 11, wherein the lower panel 22 carries a square protrusion 45 which has a tapered surface 46. The upper surface 21 contains a square-shaped indentation 47 which contains a tapered lower surface 48 so that the protrusion 45 can be slid rearwardly into the indentation 47.

Referring to FIGURE 12, the containers 20 and record could be of such a size that a high stack would place undue weight on the bottom of the stack. In such case, the containers can be stacked in a wire frame 50 which contains slots 51 on each side, spaced apart by curved portions 52, and these slots and curved portions can extend the height of the container stack in order to support each container separately along its edge. Any other suitable frame structure could be utilized to permit the large containers 20 to be stacked to heights which would not be permissible for large records without individually supporting the containers 20.

By the present invention, the interlocking protrusions and indentations permit the containers to be stacked without sliding or falling, and the label on the side of each container permits the title of the record to be read at a glance, even though the record is in the middle of or at the bottom of the stack. This eliminates shuffling through the entire collection with the possibility of scuff damage to individual records and also eliminates breakage due to repeated handling. The labels can be securely attached to the containers while still visible through the transparent plastic. During storage, the records are substantially horizontally positioned and the small felt pads eliminate possible scratching since they suspend most of the grooved surface. The slight angular position of the records help in retaining the records in the containers. All sizes of containers can be intermingled in one stack and the finger cutouts 31 allow individual records to be easily inserted and withdrawn without removing the container from the stack.

The container of the present invention fills the need for proper and safe storage of expensive records and makes them available for immediate use without the trouble of looking at each individual label to find the desired selection. As previously mentioned, coding the records through the use of groups of various colored plastic further reduces the selection time and possible damage to expensive records. It is understood that the containers can be made of various sizes and shapes, including square, and that the interior compartment can be varied to accommodate various thicknesses of records. The container provides excellent protection against dust and can be fabricated of any suitable material, such as cardboard or pressed paper, in addition to a plastic. Also, the labeling of the container can be accomplished in other ways, such as by a tape secured to the exterior of edge 23 and as previously mentioned, the number of felt pads utilized to hold up edge 27*b* of the record can be varied. In addition, the panels having the protrusions and indentations can be reversed. Various other modifications are contemplated by those skilled in the art without departing from the spirit and scope of the invention as hereinafter defined by the appended claims.

What is claimed is:

1. A record container comprising:

a pair of U-shaped side panels having spaced, parallel, straight side edges substantially tangent to a semicircular edge, an edge strip extending along the straight sides and curved edge of said panels for holding said panels in spaced relationship and forming an interior compartment adapted to contain a circular, relatively flat record, the curved edge of said container having a predetermined curvature so as to engage a record contained within said compartment along only a portion of the strip, a slot located between remaining edges of said panels located opposite said curved edge for insertion of said record into said compartment, opposed finger cutouts adjacent to said slot in said remaining edges for permitting the outer edge of a record to be gripped by the fingers for removal of the record, and pad means of resilient material located on the interior surface of the lowermost of said panels when the container is positioned horizontally for holding the outer edge of a record contained in said compartment off the lowermost of said panels causing the record to tilt downwardly from its outer edge to a point of engagement with the lowermost of said panels at said curved edge of the container, the tilt of said record causing minimum engagement of the record groove with the surfaces of said container and the tilt of the record and frictional engagement of the record with said pads resisting movement of the record out of the container.

2. A record container adapted for vertically stacking a plurality of records in flat horizontal position in separate containers, each container comprising:

a pair of flat panels having similar shapes and areas at least as large as the record surface, one of said panels being the top panel and the other panel being the bottom panel when said container is stacked in horizontal position, an edge strip extending between said panels along continuous portions of the edges thereof for holding said panels apart and forming an interior compartment for storing said record, the remaining portion of said edges being separated to provide a slot for insertion of said record into said compartment, and means located within said compartment and engaging said record at at least one selected location for holding substantially all of the grooved surface of said record in spaced relationship to said panels while said record is stored horizontally in said container.

3. A record container as defined in claim 2 wherein said engaging means comprises:

felt pad means located on the interior surface of said bottom panel when the container is positioned horizontally, said felt pad means being located to hold the edge of the record adajacent said slot off the bottom panel and to cause the record to tilt downwardly so that its opposite edge engages the bottom panel thereby holding the record grooves away from the interior surface of both said top and bottom panels.

References Cited in the file of this patent

UNITED STATES PATENTS

| | | |
|---|---|---|
| 467,343 | White | June 7, 1892 |
| 1,440,737 | Jones | Jan. 2, 1923 |
| 1,498,577 | Reinhold | June 24, 1924 |
| 1,626,930 | Crogg | May 3, 1927 |
| 1,812,751 | Mensman | June 30, 1931 |
| 2,361,479 | Joffe | Oct. 31, 1944 |
| 2,844,893 | Keller | July 29, 1958 |
| 3,009,707 | Schulein | Nov. 21, 1961 |

FOREIGN PATENTS

| | | |
|---|---|---|
| 21,009 | Great Britain | Sept. 21, 1907 |
| 578,727 | France | Oct. 2, 1924 |
| 751,244 | France | June 12, 1933 |